(12) United States Patent
Kilickaya et al.

(10) Patent No.: US 12,249,138 B2
(45) Date of Patent: Mar. 11, 2025

(54) CONTEXT-DRIVEN LEARNING OF HUMAN-OBJECT INTERACTIONS

(71) Applicant: QUALCOMM Technologies, Inc., San Diego, CA (US)

(72) Inventors: Mert Kilickaya, Amsterdam (NL); Noureldien Mahmoud Elsayed Hussein, Amsterdam (NL); Efstratios Gavves, Amsterdam (NL); Arnold Wilhelmus Maria Smeulders, Amsterdam (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 0 days.

(21) Appl. No.: 17/769,269

(22) PCT Filed: Nov. 14, 2020

(86) PCT No.: PCT/US2020/060626
§ 371 (c)(1),
(2) Date: Apr. 14, 2022

(87) PCT Pub. No.: WO2021/097378
PCT Pub. Date: May 20, 2021

(65) Prior Publication Data
US 2024/0135712 A1    Apr. 25, 2024
US 2024/0233365 A9    Jul. 11, 2024

(30) Foreign Application Priority Data
Nov. 15, 2019   (GR) .............................. 20190100515

(51) Int. Cl.
*G06V 10/00* (2022.01)
*G06V 10/44* (2022.01)
(Continued)

(52) U.S. Cl.
CPC ............ *G06V 20/00* (2022.01); *G06V 10/454* (2022.01); *G06V 10/751* (2022.01);
(Continued)

(58) Field of Classification Search
CPC .... G06V 20/00; G06V 10/454; G06V 10/751; G06V 10/764; G06V 10/778;
(Continued)

(56) References Cited

U.S. PATENT DOCUMENTS 10,628,679 B1 * 4/2020 Queen .................... G06V 20/42
2017/0357877 A1 * 12/2017 Lin ........................ G06V 20/47
(Continued)

FOREIGN PATENT DOCUMENTS

CN     108805080 A    11/2018
CN     109716354 A    5/2019
(Continued)

OTHER PUBLICATIONS

Gkioxari ("Detecting and Recognizing Human-Object Interactions, 2018 IEEE/CVF Conference on Computer Vision and Plattern Recognition, IEEE, Jun. 18, 2018 (Jun. 18, 2018), pp. 8359-8367, XP033473759, DOI: 10.1109/CVPR.2018.00872, Section 3, figures 3, 4, the Whole Document") (Year: 2018).*
(Continued)

*Primary Examiner* — Ping Y Hsieh
(74) *Attorney, Agent, or Firm* — Seyfarth Shaw LLP

(57) ABSTRACT

A method for classifying a human-object interaction includes identifying a human-object interaction in the input. Context features of the input are identified. Each identified context feature is compared with the identified human-object interaction. An importance of the identified context feature is determined for the identified human-object interaction. The context feature is fused with the identified human-object interaction when the importance is greater than a threshold.

28 Claims, 8 Drawing Sheets

(51) Int. Cl.
  *G06V 10/75* (2022.01)
  *G06V 10/764* (2022.01)
  *G06V 10/778* (2022.01)
  *G06V 10/80* (2022.01)
  *G06V 10/82* (2022.01)
  *G06V 20/00* (2022.01)
  *G06V 20/52* (2022.01)
  *G06V 40/10* (2022.01)

(52) U.S. Cl.
  CPC .......... *G06V 10/764* (2022.01); *G06V 10/778* (2022.01); *G06V 10/806* (2022.01); *G06V 10/82* (2022.01); *G06V 20/52* (2022.01); *G06V 40/10* (2022.01)

(58) Field of Classification Search
  CPC ...... G06V 10/806; G06V 10/82; G06V 20/52; G06V 40/10; G06F 18/214; G06F 18/24143; G06F 18/254
  See application file for complete search history.

(56) References Cited

U.S. PATENT DOCUMENTS

| | | | |
|---|---|---|---|
| 2018/0101955 | A1 | 4/2018 | Varadarajan et al. |
| 2019/0180090 | A1 | 6/2019 | Jiang et al. |
| 2019/0286892 | A1 | 9/2019 | Li et al. |
| 2020/0012924 | A1* | 1/2020 | Ma .................. G06V 10/764 |
| 2020/0054306 | A1* | 2/2020 | Mehanian ............ A61B 8/5223 |

FOREIGN PATENT DOCUMENTS

| | | | | |
|---|---|---|---|---|
| CN | 110263872 | A * | 9/2019 | .......... G06K 9/6256 |
| WO | 2017007626 | A1 | 1/2017 | |
| WO | 2019109972 | A1 | 6/2019 | |

OTHER PUBLICATIONS

Gkioxari G., et al., "Detecting and Recognizing Human-Object Interactions", 2018 IEEE/CVF Conference on Computer Vision and Pattern Recognition, IEEE, Jun. 18, 2018 (Jun. 18, 2018), pp. 8359-8367, XP033473759, DOI: 10.1109/CVPR.2018.00872, [retrieved on Dec. 14, 2018], Section 3, figures 3, 4, the Whole Document.
International Search Report and Written Opinion—PCT/US2020/060626—ISA/EPO—Feb. 25, 2021.
Kilickaya M., et al., "Self-Selective Context for Interaction Recognition", ARXIV.ORG, Cornell University Library, 201 Olin Library Cornell University Ithaca, NY 14853, Oct. 17, 2020 (Oct. 17, 2020), XP081789790, 8 Pages, the Whole Document.
Nguyen T H., et al., "Automatic Video Captioning Using Deep Neural Network", Master's Thesis of Rochester Institute of Technology RIT Scholar Works, Apr. 1, 2017 (Apr. 1, 2017), XP055549091, 91 Pages, ISBN: 978-0-355-16049-9, Retrieved from the Internet: URL:https://scholarworks.rit.edu/cgi/viewcontent.cgi?referer=&httpsredir=1&article=10677&context=theses [retrieved on Jan. 29, 2017] the Whole Document.
Zhuang B., et al., "Towards Context-Aware Interaction Recognition for Visual Relationship Detection", 2017 IEEE International Conference on Computer Vision (ICCV), IEEE, Oct. 22, 2017 (Oct. 22, 2017), pp. 589-598, KP033282914, DOI: 10.1109/ICCV.2017.71, [retrieved on Dec. 22, 2017], Section 3, figures 2, 3, the whole document.

* cited by examiner

Early Fusion

Late Fusion

Adaptive Fusion

CONTEXT-DRIVEN LEARNING OF HUMAN-OBJECT INTERACTIONS

CROSS-REFERENCE TO RELATED APPLICATION

The present application is a national stage entry under 35 U.S.C. 371 of PCT/US20/60626, filed on Nov. 14, 2020, and titled "CONTEXT-DRIVEN LEARNING OF HUMAN-OBJECT INTERACTIONS," which claims priority to Greece Patent Application No. 20190100515, filed on Nov. 15, 2019, and titled "CONTEXT-DRIVEN LEARNING OF HUMAN-OBJECT INTERACTIONS," the disclosure of which is expressly incorporated by reference in its entirety.

FIELD OF DISCLOSURE

Aspects of the present disclosure generally relate to object classification and, more particularly, to object classification based on context and human-object appearance.

BACKGROUND

An artificial neural network, which may comprise an interconnected group of artificial neurons (e.g., neuron models), may refer to a computational device or a method to be performed by a computational device. The artificial neural network may be used for various applications and/or devices, such as Internet Protocol (IP) cameras, Internet of Things (IoT) devices, autonomous vehicles, and/or service robots.

Context may be useful for classifying visual scenes. For example, context may determine objects or actions in the image, object co-occurrence, and/or spatial locations of objects. In some cases, context may be used to improve human-object interaction classification. In most cases, conventional classification systems always consider context when classifying a human-object interaction. It is desirable to improve the use of context in classification systems.

SUMMARY

In an aspect of the present disclosure, a method for classifying an input is provided. The method includes identifying a human-object interaction in the input. The method also includes identifying context features of the input. Additionally, the method includes comparing each identified context feature with the identified human-object interaction. The method also includes determining an importance of the identified context feature for the identified human-object interaction. Further, the method includes fusing the context feature with the identified human-object interaction when the importance is greater than a threshold.

In another aspect of the present disclosure, an apparatus for classifying an input is provided. The apparatus includes a memory and one or more processors coupled to the memory. The processor(s) are configured to identify a human-object interaction in the input. The processor(s) are also configured to identify context features of the input. In addition, the processor(s) are configured to compare each identified context feature with the identified human-object interaction. The processor(s) are also configured to determine an importance of the identified context feature for the identified human-object interaction. Further, the processor(s) are configured to fuse the context feature with the identified human-object interaction when the importance is greater than a threshold.

In another aspect of the present disclosure, an apparatus for classifying an input is provided. The apparatus includes means for identifying a human-object interaction in the input. The apparatus also includes means for identifying context features of the input. Additionally, the apparatus includes means for comparing each identified context feature with the identified human-object interaction. The apparatus also includes means for determining an importance of the identified context feature for the identified human-object interaction. Further, the apparatus includes means for fusing the context feature with the identified human-object interaction when the importance is greater than a threshold.

In another aspect of the present disclosure, a non-transitory computer readable medium is provided. The computer readable medium has encoded thereon program code for classifying an input. The program code is executed by a processor and includes code to identify a human-object interaction in the input. The program code also includes code to identify context features of the input. Additionally, the program code includes code to compare each identified context feature with the identified human-object interaction. The program code also includes code to determine an importance of the identified context feature for the identified human-object interaction Furthermore, the program code includes code to fuse the context feature with the identified human-object interaction when the importance is greater than a threshold.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
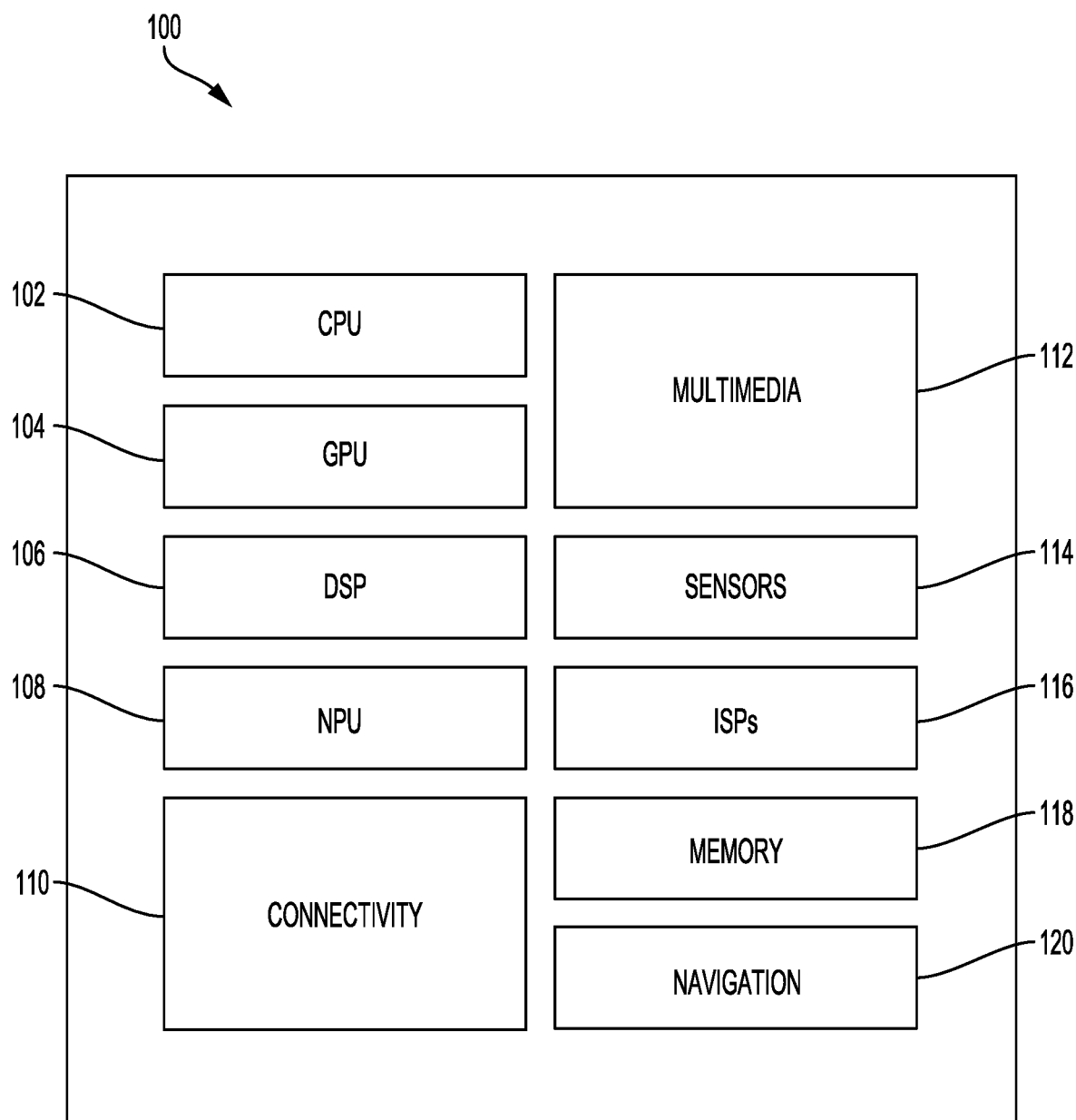
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A human-object interaction may be characterized by (verb, noun) pairs describing the relationship between a human and the object of interaction, such as (ride, bicycle) or (walk, horse). In some cases, contextual cues are used to improve the classification of a human-object interaction. The context may be obtained from a surrounding environment (e.g., scene). The surrounding environment may identify possible interaction sets. Additionally, or alternatively, context may also be obtained from co-occurring objects. For example, a human may be surrounded by books while reading a book inside the library, or other bicycles when racing in a cycling tournament. Some systems also incorporate body-part context in a classification model.

Conventional techniques for combining human-object appearance and context include early fusion or late fusion. In a late fusion system, human appearance and co-occurring object appearances are separately encoded by non-weight sharing neural networks. The predictions of the non-weight sharing neural networks are combined at the classifier layer in the form of late fusion. In an early fusion system, a neural network combines contextual representations and human-object representations at an early stage. The neural network jointly processes the combination to generate the interaction prediction. In the present disclosure, a contextual representation may also be referred to as context representation.

Human-object interactions provide a rich set of contextual information that may not be leveraged by conventional systems. For example, early fusion systems are not scalable because multiple contextual feature combinations increase feature dimensionality resulting in a decrease in system performance. The increase in feature dimensionality may result in limiting the use of context to global surroundings or object co-occurrence. Furthermore, late fusion systems do not take advantage of the correlation between human-object and contextual resources. Therefore, late fusion systems cannot adaptively apply context information.

Aspects of the present disclosure are directed to a system that adaptively uses contextual information when classifying human-object interactions. In one configuration, a set of contextual information is defined to improve interaction recognition (e.g., classification). Additionally, a gating mechanism learns to identify when context information should be used to classify human-object interactions.

FIG. 1 illustrates an example implementation of a system-on-a-chip (SOC) 100, which may include a central processing unit (CPU) 102 or a multi-core CPU configured for adaptive context representation and human-object representation fusion via a neural network in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code for identifying a human-object interaction in the input. The general-purpose processor 102 may also comprise code for identifying context features of the input. The general-purpose processor 102 may further comprise code for comparing each identified contextual feature with the identified human-object interaction. The general-purpose processor 102 may also comprise code for determining an importance of the identified context feature for the identified human-object interaction. Finally, the general-purpose processor 102 may comprise code for fusing the contextual feature with the identified human-object interaction when the importance is greater than a threshold.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
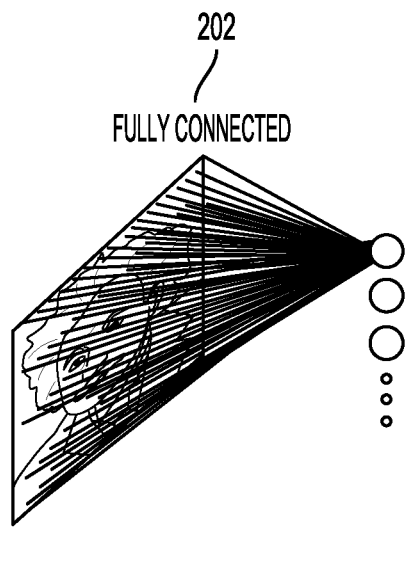
FIGS. 2A, 2B, and 2C are diagrams illustrating a neural network in accordance with aspects of the present disclosure.
Figure 2B:
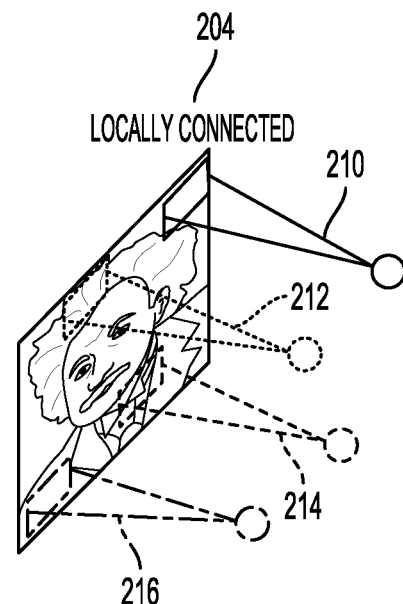

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
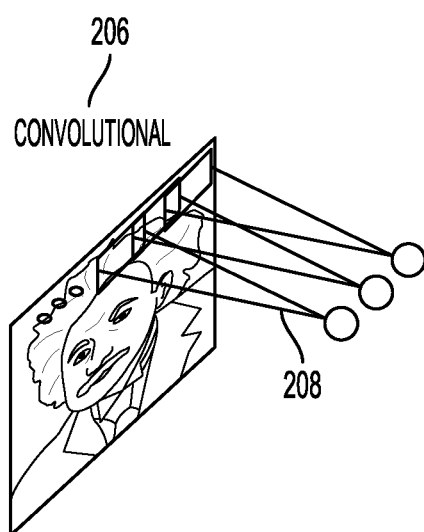

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
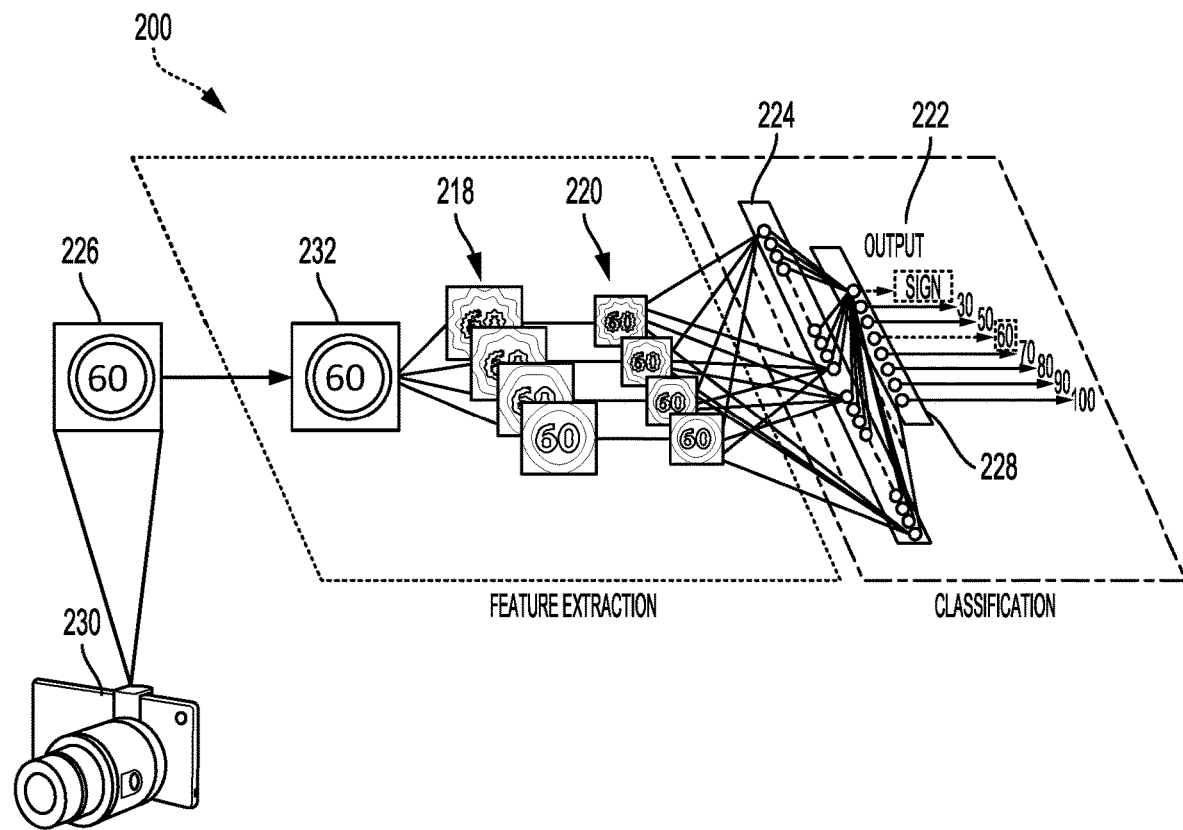
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
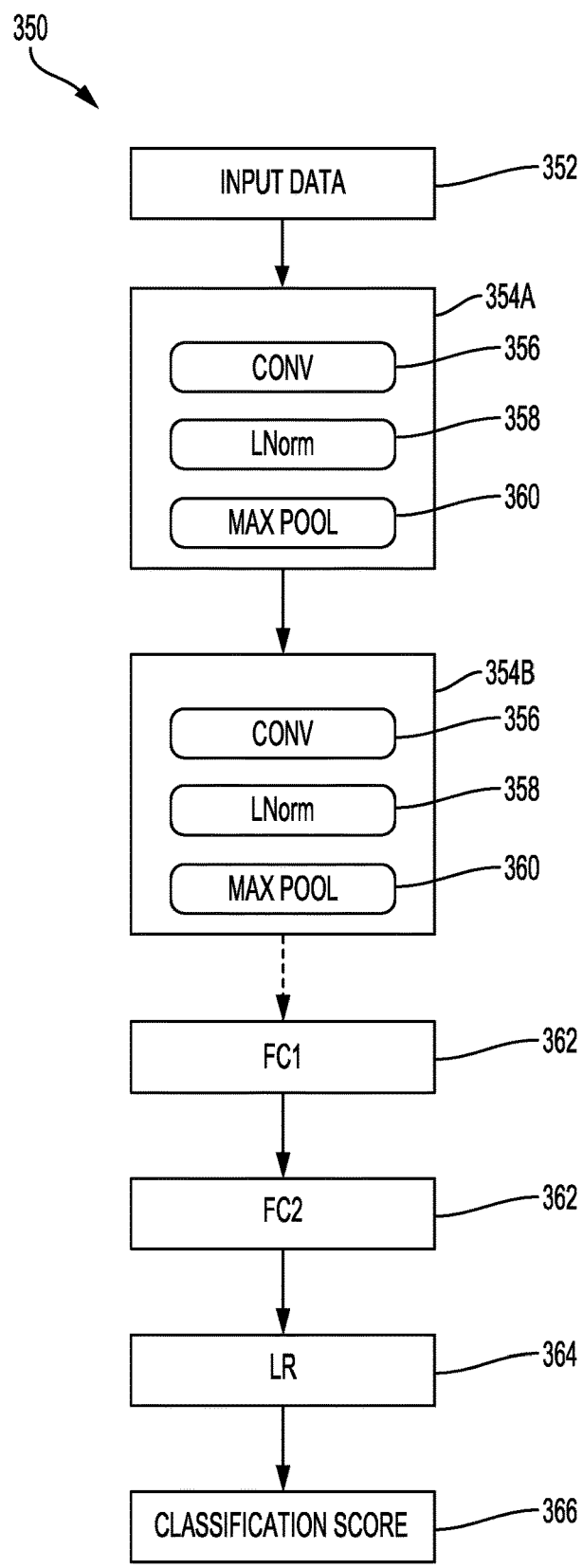
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4A:
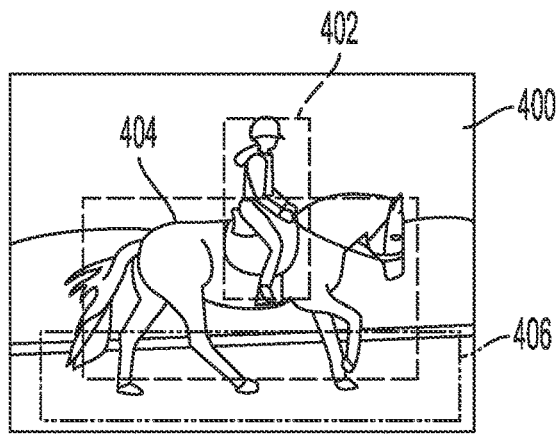
FIG. 4A illustrates an example of a conventional classification system.
Figure 4A:
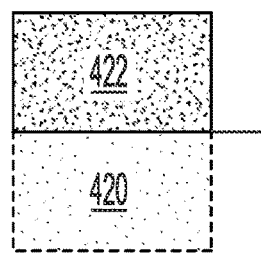
Figure 4A:
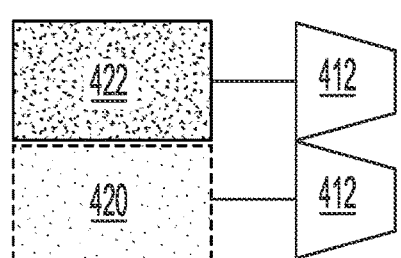

FIG. 4A illustrates an example of a conventional classification system. In the example of FIG. 4A, an image 400 is provided to a neural network 410, 412 for classification. The image 400 includes a human 402, an object 404 (e.g., horse), and context 406 (e.g., equestrian center).

As discussed, an early fusion neural network 410 combines contextual representations 420 (e.g., contextual features) and human-object representations 422 at an early stage (e.g., prior to classification). The early fusion neural network 410 processes the combination to generate an interaction prediction.

As also shown in FIG. 4A, a late fusion neural network 412 separately encodes human-object representations 422 and contextual representations 420. The late fusion neural network 412 may be a non-weight sharing neural network and used to separately encode the representations 422, 420. The predictions of the non-weight sharing neural networks are combined at a classifier layer (not shown).

Figure 4B:
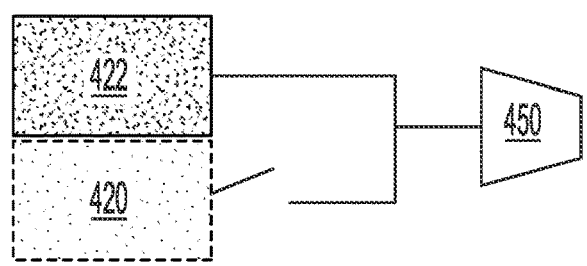
FIG. 4B illustrates an example of an adaptive fusion neural network in accordance with aspects of the present disclosure.

FIG. 4B illustrates an example of an adaptive fusion neural network 450, according to aspects of the present disclosure. As shown in FIG. 4B, the input from the contextual representations 420 to the adaptive fusion neural network 450 is gated. The contextual representations 420 and human-object representations 422 of the adaptive fusion neural network 450 may be received from a single image, such as the image 400 of FIG. 4A. That is, the contextual representations 420 are only used when the contextual representations 420 are useful in classifying the human-object interactions. The adaptive fusion neural network 450 may generate class probabilities over (verb, noun) pairs that describe the relationship between a human and one or more objects in the image.

In one configuration, an adaptive fusion neural network generates a human-object feature vector $f_{\{action\}}$. The human-object features may be obtained from a penultimate layer of a convolutional neural network (CNN). The adaptive fusion neural network receives an image I as well as human detection $b_{\{h\}}$ and object detection $b_{\{o\}}$ boxes that localize the human and objects in the image I. The adaptive fusion neural network generates a fixed-size feature vector $R^d$ summarizing the appearance of human and object for interaction prediction. The feature vector $R^d$ may be coupled with contextual features.

The adaptive fusion neural network also generates a context feature vector $f_{\{context\}}$. The context features may be obtained from the penultimate layer of the CNN. In one configuration, multiple contextual information sources are combined. For simplicity, in the current example, now, context feature vector $f_{\{context\}}$ is a fixed-size feature vector $R^m$ comprised of multiple context features. As discussed, the context features may be adaptively combined with the human-object features.

The final feature representation $f_{\{final\}}$ is generated based on the human-object feature vector $f_{\{action\}}$ and an optional concatenation of the context feature vector $f_{\{context\}}$, such that $f_{\{final\}}=[f_{\{action\}}, \lambda(f_{\{context\}})]$. The parameter $\lambda$ is a free, binary parameter that determines if the context will be used or not (one if used, zero if not). The final feature representation $f_{\{final\}}$ is input to an interaction classifier $f_{\{classifier\}}$ that outputs probabilities of (verb, noun,) pairs. In one configuration, during training, a standard cross-entropy loss is determined based on the probabilities. Each sub-network may be updated based on the loss.

The context sub-module determines if the contextual features are helpful to classify the interaction in the image. For example, the scene context from a jockey club would be relevant to classify the interaction (ride, horse) and would be irrelevant for the interaction (eat, sandwich). The relevance of context may be relative to humans and objects that appear in an environment.

In one configuration, a context-gating sub-module $f_{\{gate\}}$ gates the context. The input to the context-gating sub-module $f_{\{gate\}}$ is a concatenation of the action and context $[f_{\{action\}}, f_{\{context\}}]$ of dimensionality (d+m). The output of $f_{\{gate\}}$ is $\lambda$. As discussed, $\lambda$ provides the importance of context. A binary (e.g., discrete) output of either one or zero is used. A binary output specifies a non-differentiable operation.

In one configuration, a sigmoid nonlinearity is applied to the output of the context-gating sub-module (e.g., sigmoid $(f_{\{gate\}})$). During training, the neural network may degenerate to a specific value, such as one or zero. To avoid degenerate solutions (e.g., always outputting a one or zero), random noise may be drawn from a Gaussian distribution N(m=0, s=1). A hard thresholding operation may be applied to the sigmoid($f_{\{gate\}}$). The hard thresholding operation converts the output to either one (higher than a threshold) or zero (lower than the threshold).

The non-differentiable operation cannot be used to obtain gradients, therefore, training is not possible. To that end, a straight-through estimator may be used to bypass the non-differentiability. The straight-through estimator provides asymmetry to forward and backward propagation in the neural network. In the forward pass, for inference, the thresholding operation is applied and the prediction is based on the thresholded value. In the backward pass, the threshold operation is bypassed, and the gradients are propagated through continuous values of the gate output.

Figure 5A:
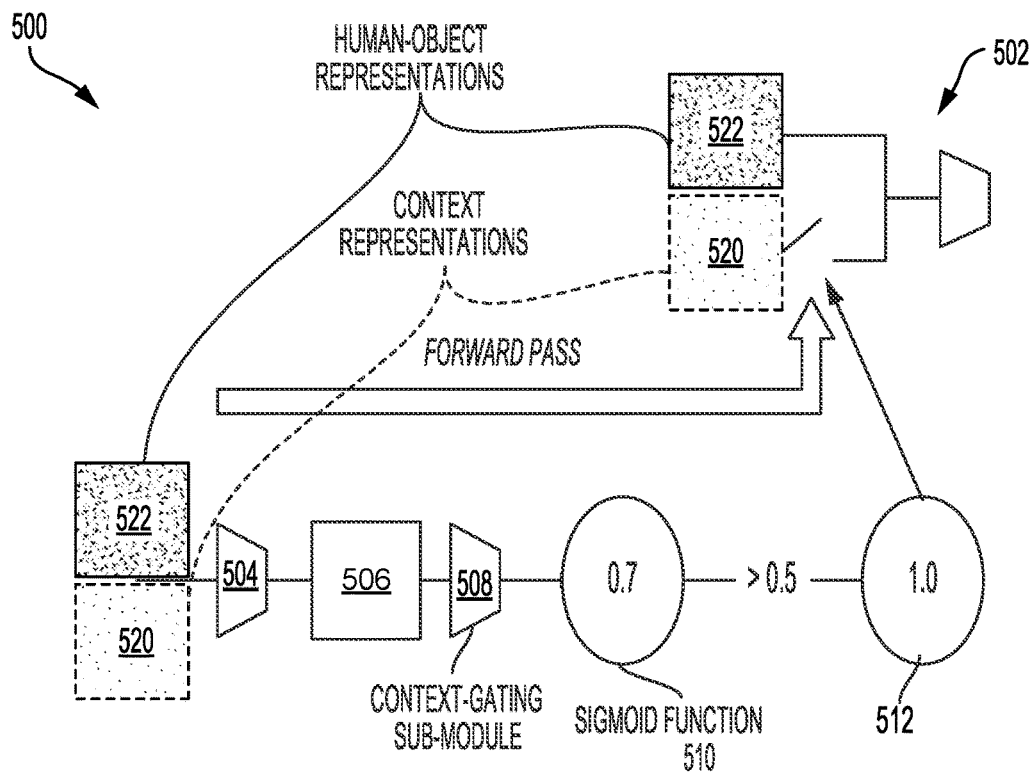
FIG. 5A illustrates an example of a forward pass operation of an adaptive model in accordance with aspects of the present disclosure.

FIG. 5A illustrates an example of a forward pass operation 500 of an adaptive model 502, according to aspects of the present disclosure. As shown in FIG. 5A, context representations 520 and human-object representations 522 may be input to a neural network. Fully connected layers 504 of the neural network generate non-linear mappings 506 which operate on top of the context representations 520. Non-linear mappings 506 canonicalize the dimensionality of different context representations 520 such that context representations 520 and human-object representations 522 can be fused/gated together. A context-gating sub-module 508 generates an output based on the concatenation of the action and context [$f_{\{action\}}$, $f_{\{context\}}$]. A sigmoid function 510 is applied to the output of the context-gating sub-module 508, such an output of the sigmoid function 510 is a value between zero and one.

A hard thresholding operation 512 may be applied to the output of the sigmoid function 510. If the output is greater than the threshold (e.g., greater than 0.5), the output is set to one. If the output is less than the threshold (e.g., less than 0.5), the output is set to zero. The threshold (0.5) is for illustrative purposes only. In the present example, a value of one gates the context representations 520 to the human-object representations 522. A value of zero does not gate the context representations 520 to the human-object representations 522.

Figure 5B:
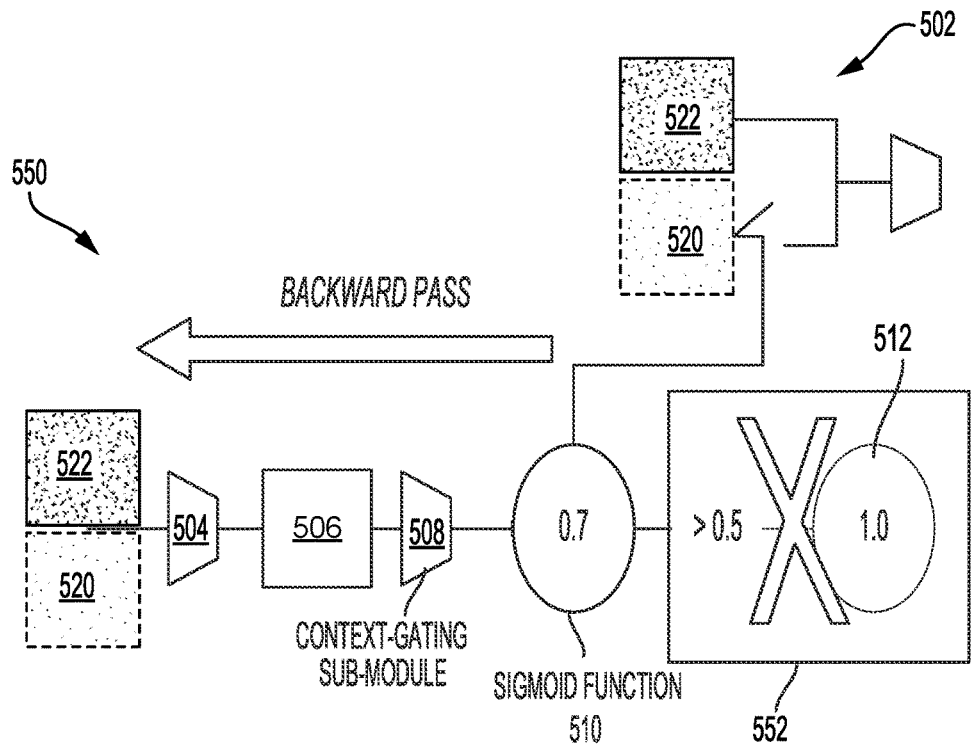
FIG. 5B illustrates an example of a backward pass operation in accordance with aspects of the present disclosure.

FIG. 5B illustrates an example of a backward pass operation 550 for an adaptive model 502, according to aspects of the present disclosure. As shown in FIG. 5B, the threshold operation 512 is bypassed 552 (denoted by X over the connection), and the gradients are propagated through continuous values of the gate output.

As discussed, the framework for the adaptive model 502 may incorporate one or more contextual representations. The contextual representations may include one or more of, for example, clothing, human-object spatial relations, scene locality, scene geometry, and/or co-occurring objects.

Feature activations of a pre-trained CNN may be used to extract clothing representations. To model objects that co-occur with the interaction, object regions may be sampled from an area around a human. Class predictions may be obtained from an object detection network. A one-hot encoding vector is generated to represent object categories that are present in the vicinity of the human.

Human-object spatial relations may be encoded by initializing an initial feature map having a same size as the image. One map encodes a location of the human, and the other map encodes a location of the object.

The locality of the scene provides cues about forms of interactions that may be performed at the scene. For example, a sky region may indicate a kite flying interaction (fly, kite), whereas a road would indicate a car driving interaction (drive, car) or a bike riding interaction (ride, bicycle). To that end, semantic segments of the scene may be extracted and the activations may be used as a descriptor of the locality of the scene.

Figure 6:
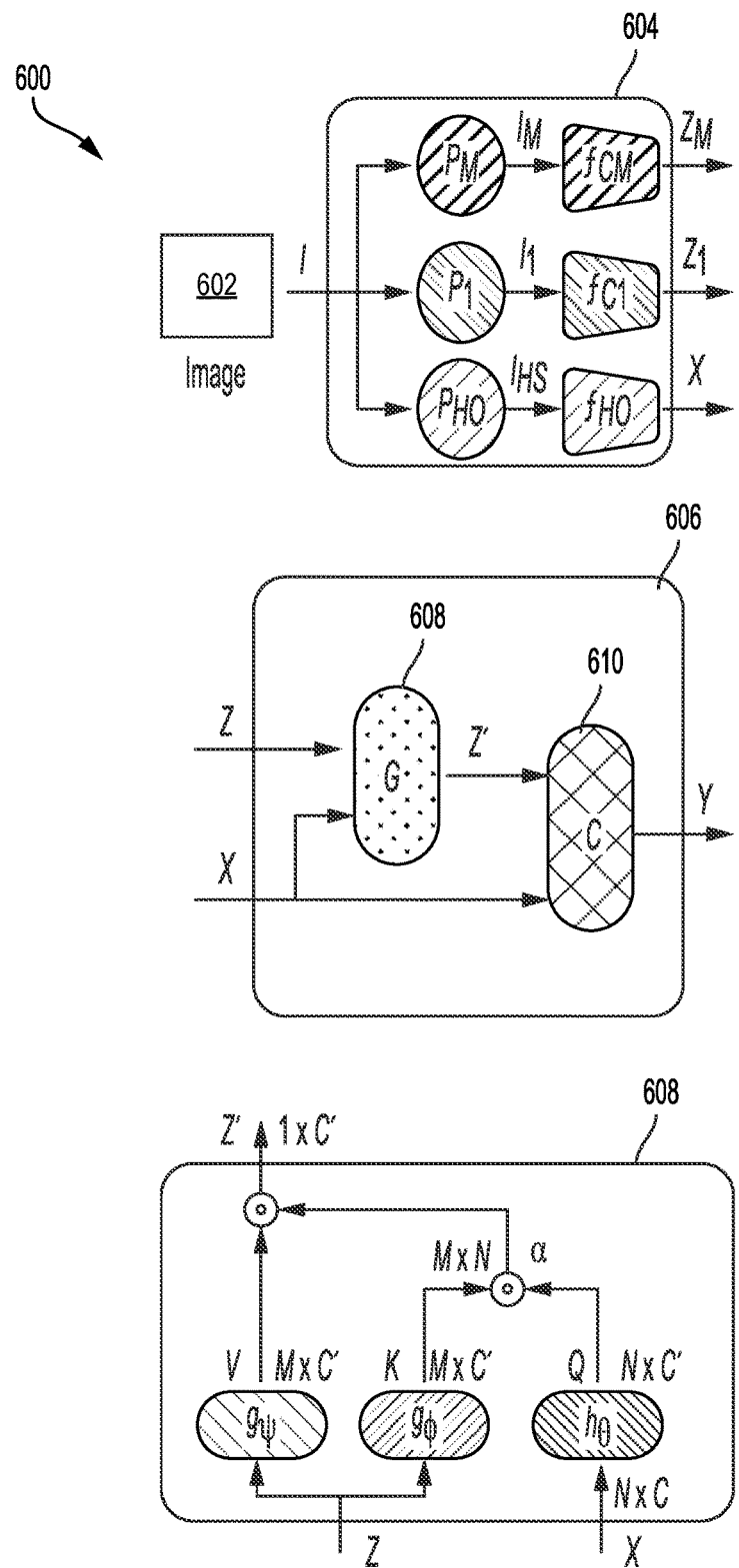
FIG. 6 illustrates an overview of an adaptive model in accordance with aspects of the present disclosure.

FIG. 6 illustrates an overview of an adaptive model 600, according to aspects of the present disclosure. As shown in FIG. 6, the adaptive model 600 includes a feature extraction module 604 that receives an input image 602. The feature extraction module 604 may be a convolutional neural network (e.g., deep convolutional neural network 350 of FIG. 3). The feature extraction module 604 determines context representations $Z_1$ to $Z_M$ based on the various context representations available in the scene (e.g., clothing, human-object spatial relations, scene locality, scene geometry, and/or co-occurring objects). The context representations $Z_1$ to $Z_M$ are determined from features $f_{C1}$ to $f_{CM}$ processed by a convolutional neural network. In FIG. 6, I is the input image 602 to a human-object feature extractor. P blocks (e.g., $P_M$, $P_1$, $P_{HO}$) are fully connected layers of a neural network. The P blocks process M context features extracted from image I independently to provide modality-specific preprocessing, such as image normalization, object segmentation (for object context), and/or scene segmentation (for local scene context). Because the same image may be used for human-object or context extraction, the feature extraction module 604 may also determine a human-object representation X based on the human and object in the scene depicted in image I. The human-object representation X is determined from features $f_{HO}$ processed by a convolutional neural network.

For each context representation $Z_1$ to $Z_M$, a classification model 606 determines if the context representation should be gated with the human-object representation X to determined probabilities of (verb, noun) pairs. As shown in FIG. 6, the classification model 606 includes a gating module 608 and a classifier 610..

For each context representation $Z_1$ to $Z_M$, the gating module 608 receives a human-object representation X vector of size N×C and a context representation Z vector of size M×C'. A first gating function he converts the human-object representation X vector to a second human-object representation Q of size N×C'. The functions $h_\Theta$, and $g_\Phi$ respectively map the human-object representation and the representation to the same sub-space, such that they can be compared for compatibility via a dot product. The compatibility score modulates the input context feature using $g_\psi$.

The context representation Z generates second and third context vectors V, K of size M×C'. A dot product of the second human-object representation Q and the third context vector K generates a one-dimensional similarity scalar score α per-context feature Z of size M×N. The similarity scalar score α determines if the context representation is related to the human-object representation. For example, a library location is not related to an interaction between a human and a sandwich. In contrast, the library location may be related to an interaction between a human and a book.

A dot product of the similarity scalar score α and the second context vector V generates the gating output vector Z' of size 1×C'. That is, the similarity scalar score α may be used to re-weigh the context representation Z for further computation (e.g., classification of the input with the modulated context representation via classifier 610).

Figure 7:
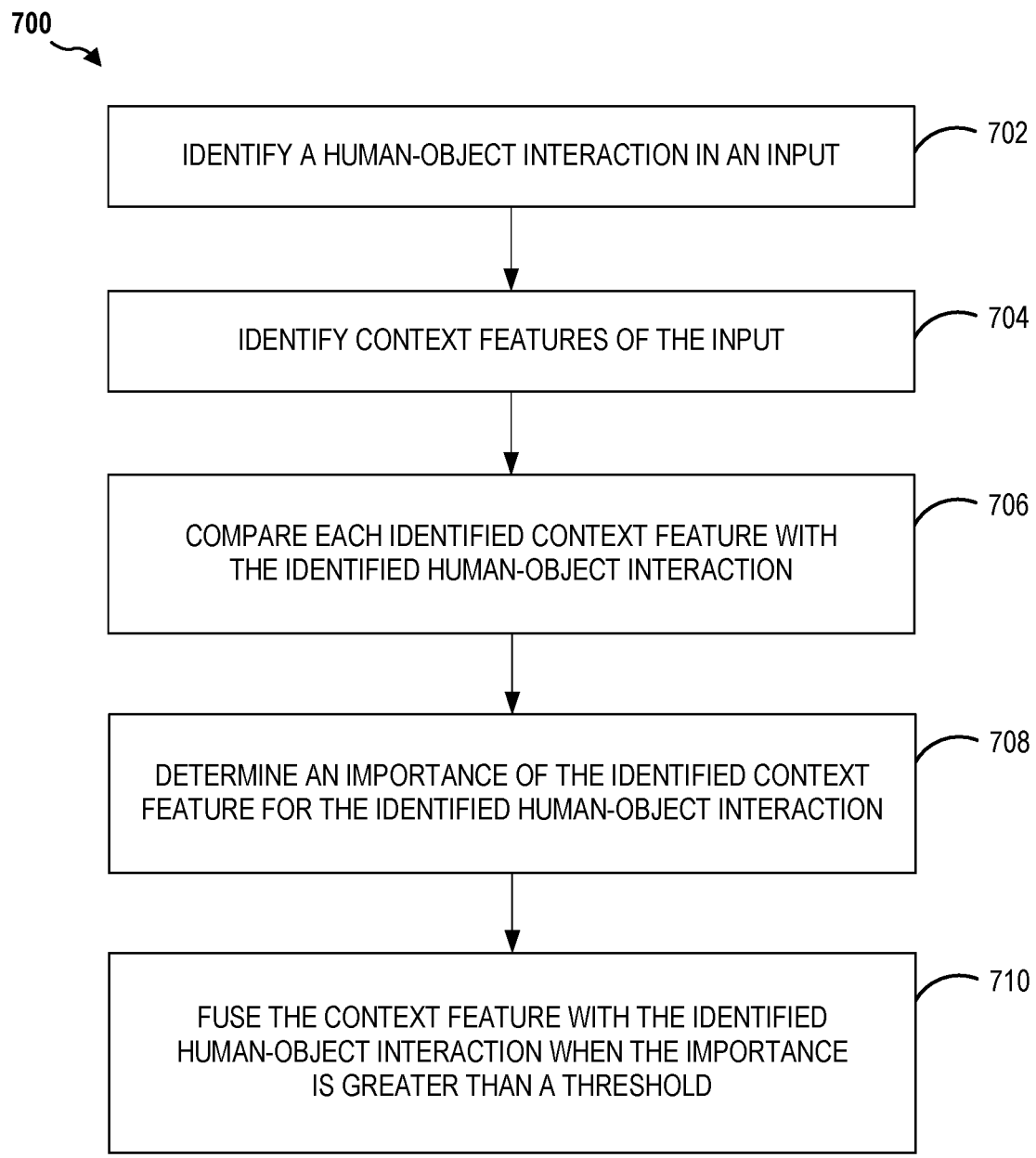
FIG. 7 illustrates a flow diagram for a method for classifying an input in accordance with aspects of the present disclosure.

FIG. 7 illustrates a flow diagram for a method 700 for classifying an input according to aspects of the present disclosure. As shown in FIG. 7, at block 702, a neural network identifies a human-object interaction in the input. The input may be an image of a human and an object in an environment. At block 704, the neural network identifies context features of the input. The context features may be helpful in classifying the human-object interaction. The context features may include clothing, human-object spatial relations, scene locality, scene geometry, and/or co-occurring objects.

At block 706, the neural network compares each identified context feature with the identified human-object interaction. At block 708, the neural network determines an importance of the identified context feature for the identified human-object interaction. At block 710, the neural network fuses the context feature with the identified human-object interaction when the importance is greater than a threshold.

In one configuration, the neural network determines a probability of a verb and noun pair based on the fused representation of human-object interaction and context. The probability may be used to classify the human-object interaction of the input.

In an optional configuration, during training, noise is added to context representations to robustify the importance prediction in a training forward pass. In one configuration, the noise is removed during a training backward pass. The classifier may be robust to horizontal and vertical flipping. Additionally, in an optional configuration, a location of a human bounding box and/or object bounding box is jittered during training. The jittering provides robustness to jitter in an input.

In some aspects, the method 700 may be performed by the SOC 100 (FIG. 1). That is, each of the elements of the method 700 may, for example, but without limitation, be performed by the SOC 100 or one or more processors (e.g., CPU 102) and/or other included components.

Implementation examples are described in the following numbered clauses:

1. A method for classifying an input, comprising:
   identifying a human-object interaction in the input;
   identifying context features of the input;
   comparing each identified context feature with the identified human-object interaction;
   determining an importance of the identified context feature for the identified human-object interaction; and
   fusing the context feature with the identified human-object interaction when the importance is greater than a threshold.
2. The method of clause 1, in which the context features comprise one or more of clothing, human body part features, human-object spatial relations, scene locality, scene geometry, or co-occurring objects.
3. The method of clause 1, further comprising determining a probability of a verb and noun pair based on the fused representation of the human-object interaction and the context features.
4. The method of clause 1, further comprising adding noise during a training forward pass to robustify the importance determination.
5. The method of clause 4, further comprising removing the noise during a training backward pass.
6. The method of clause 1, in which a classifier for classifying the input is robust to horizontal and vertical flipping.
7. The method of any of clauses 1-6, further comprising jittering a location of a human bounding box and/or object bounding box during training.
8. An apparatus, comprising:
   a memory; and
   at least one processor coupled to the memory, the at least one processor configured:
   to identify a human-object interaction in the input;
   to identify context features of the input;
   to compare each identified context feature with the identified human-object interaction;
   to determine an importance of the identified context feature for the identified human-object interaction; and
   to fuse the context feature with the identified human-object interaction when the importance is greater than a threshold.
9. The apparatus of clause 8, in which the context features comprise clothing, human-object spatial relations, scene locality, scene geometry, and/or co-occurring objects.
10. The apparatus of clause 8, in which the at least one processor is further configured to determine a probability of a verb and noun pair based on the fused representation of the human-object interaction and the context features.
11. The apparatus of clause 8, in which the at least one processor is further configured to add noise during a training forward pass to robustify the importance determination.
12. The apparatus of clause 11, in which the at least one processor is further configured to remove the noise during a training backward pass.
13. The apparatus of clause 8, in which a classifier for classifying the input is robust to horizontal and vertical flipping.
14. The apparatus of any of clauses 8-13, in which the at least one processor is further configured to jitter a location of a human bounding box and/or object bounding box during training.
15. An apparatus, comprising:
    means for identifying a human-object interaction in the input;
    means for identifying context features of the input;
    means for comparing each identified context feature with the identified human-object interaction;
    means for determining an importance of the identified context feature for the identified human-object interaction; and
    means for fusing the context feature with the identified human-object interaction when the importance is greater than a threshold.
16. The apparatus of clause 15, in which the context features comprise one or more of clothing, human body part features, human-object spatial relations, scene locality, scene geometry, or co-occurring objects.
17. The apparatus of clause 15, further comprising means for determining a probability of a verb and noun pair based on the fused representation of the human-object interaction and the context features.
18. The apparatus of clause 15, further comprising means for adding noise during a training forward pass to robustify the importance determination.
19. The apparatus of clause 18, further comprising means for removing the noise during a training backward pass.
20. The apparatus of clause 15, in which a classifier for classifying the input is robust to horizontal and vertical flipping.
21. The apparatus of any of clauses 15-20, further comprising means for jittering a location of a human bounding box and/or object bounding box during training.
22. A non-transitory computer-readable medium having program code recorded thereon, the program code executed by a processor and comprising:
    program code to identify a human-object interaction in the input;
    program code to identify context features of the input;
    program code to compare each identified context feature with the identified human-object interaction;
    program code to determine an importance of the identified context feature for the identified human-object interaction; and
    program code to fuse the context feature with the identified human-object interaction when the importance is greater than a threshold.
23. The non-transitory computer-readable medium of clause 22, in which the context features comprises one or more of clothing, human-object spatial relations, scene locality, scene geometry, or co-occurring objects.
24. The non-transitory computer-readable medium of clause 22, further comprising program code to determine a probability of a verb and noun pair based on the fused representation of the human-object interaction and the context features.

25. The non-transitory computer-readable medium of clause 22, further comprising program code to add noise during a training forward pass to robustify the importance determination.

26. The non-transitory computer-readable medium of clause 25, further comprising program code to remove the noise during a training backward pass.

27. The non-transitory computer-readable medium of clause 22, in which a classifier for classifying the input is robust to horizontal and vertical flipping.

28. The non-transitory computer-readable medium of any of clauses 22-27, further comprising program code to jitter a location of a human bounding box and/or object bounding box during training.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for classifying an input, the processor implemented method being performed by one or more processors and comprising:
   identifying a human-object interaction in the input;
   identifying context features of the input;
   comparing each identified context feature with the identified human-object interaction;
   determining an importance score of the identified context feature for the identified human-object interaction based on the comparing;
   fusing the context feature with the identified human-object interaction to obtain a fused representation responsive to the importance score being greater than a threshold; and
   classifying the human-object interaction based on the fused representation.

2. The processor-implemented method of claim 1, in which the context features comprise one or more of clothing, human body part features, human-object spatial relations, scene locality, scene geometry, or co-occurring objects.

3. The processor-implemented method of claim 1, further comprising determining a probability of a verb and noun pair based on the fused representation of the human-object interaction and the context features.

4. The processor-implemented method of claim 1, further comprising adding noise during a training forward pass to robustify the importance score determination.

5. The processor-implemented method of claim 4, further comprising removing the noise during a training backward pass.

6. The processor-implemented method of claim 1, in which a classifier for classifying the input is robust to horizontal and vertical flipping.

7. The processor-implemented method of claim 1, further comprising jittering a location of one or more of a human bounding box or object bounding box during training.

8. An apparatus, comprising:
at least one memory; and
at least one processor coupled to the at least one memory, the at least one processor configured to:
identify a human-object interaction in an input;
identify context features of the input;
perform a comparison of each identified context feature with the identified human-object interaction;
determine an importance score of the identified context feature for the identified human-object interaction based on the comparison;
fuse the context feature with the identified human-object interaction to obtain a fused representation responsive to the importance score being greater than a threshold; and
classify the human-object interaction based on the fused representation.

9. The apparatus of claim 8, in which the context features comprise one or more of clothing, human-object spatial relations, scene locality, scene geometry, or co-occurring objects.

10. The apparatus of claim 8, in which the at least one processor is further configured to determine a probability of a verb and noun pair based on the fused representation of the human-object interaction and the context features.

11. The apparatus of claim 8, in which the at least one processor is further configured to add noise during a training forward pass to robustify the importance score determination.

12. The apparatus of claim 11, in which the at least one processor is further configured to remove the noise during a training backward pass.

13. The apparatus of claim 8, in which a classifier for classifying the input is robust to horizontal and vertical flipping.

14. The apparatus of claim 8, in which the at least one processor is further configured to jitter a location of one or more of a human bounding box or object bounding box during training.

15. An apparatus, comprising:
means for identifying a human-object interaction in an input;
means for identifying context features of the input;
means for performing a comparison of each identified context feature with the identified human-object interaction;
means for determining an importance score of the identified context feature for the identified human-object interaction based on the comparison;
means for fusing the context feature with the identified human-object interaction to obtain a fused representation responsive to the importance score being greater than a threshold; and
means for classifying the human-object interaction based on the fused representation.

16. The apparatus of claim 15, in which the context features comprise one or more of clothing, human body part features, human-object spatial relations, scene locality, scene geometry, or co-occurring objects.

17. The apparatus of claim 15, further comprising means for determining a probability of a verb and noun pair based on the fused representation of the human-object interaction and the context features.

18. The apparatus of claim 15, further comprising means for adding noise during a training forward pass to robustify the importance score determination.

19. The apparatus of claim 18, further comprising means for removing the noise during a training backward pass.

20. The apparatus of claim 15, in which a classifier for classifying the input is robust to horizontal and vertical flipping.

21. The apparatus of claim 15, further comprising means for jittering a location of one or more of a human bounding box or object bounding box during training.

22. A non-transitory computer-readable medium having program code recorded thereon, the program code executed by a processor and comprising:
program code to identify a human-object interaction in an input;
program code to identify context features of the input;
program code to perform a comparison of each identified context feature with the identified human-object interaction;
program code to determine an importance score of the identified context feature for the identified human-object interaction based on the comparison;
program code to fuse the context feature with the identified human-object interaction to obtain a fused representation responsive to the importance score being greater than a threshold; and
program code to classify the human-object interaction based on the fused representation.

23. The non-transitory computer-readable medium of claim 22, in which the context features comprises one or more of clothing, human-object spatial relations, scene locality, scene geometry, or co-occurring objects.

24. The non-transitory computer-readable medium of claim 22, further comprising program code to determine a probability of a verb and noun pair based on the fused representation of the human-object interaction and the context features.

25. The non-transitory computer-readable medium of claim 22, further comprising program code to add noise during a training forward pass to robustify the importance score determination.

26. The non-transitory computer-readable medium of claim 25, further comprising program code to remove the noise during a training backward pass.

27. The non-transitory computer-readable medium of claim 22, in which a classifier for classifying the input is robust to horizontal and vertical flipping.

28. The non-transitory computer-readable medium of claim 22, further comprising program code to jitter a location of one or more of a human bounding box or object bounding box during training.

* * * * *